(12) United States Patent
Park

(10) Patent No.: US 7,014,732 B2
(45) Date of Patent: Mar. 21, 2006

(54) ETCHING APPARATUS

(75) Inventor: Sung Guen Park, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 12 days.

(21) Appl. No.: 10/330,433

(22) Filed: Dec. 30, 2002

(65) Prior Publication Data

US 2003/0127189 A1   Jul. 10, 2003

(30) Foreign Application Priority Data

Dec. 29, 2001   (KR) ............................... 2001-88521

(51) Int. Cl.
    *C23F 1/00*    (2006.01)
    *B08B 3/00*    (2006.01)

(52) U.S. Cl. ................... 156/345.15; 134/113

(58) Field of Classification Search ........... 156/345.11, 156/345.15, 916, 345.16; 73/290 R, 293; 250/577, 900, 901, 903, 227.14; 134/198, 134/22.11, 104.1, 113
See application file for complete search history.

(56) References Cited

U.S. PATENT DOCUMENTS

| | | | | |
|---|---|---|---|---|
| 3,865,704 A | * | 2/1975 | Reed et al. ................... | 216/86 |
| 4,190,481 A | * | 2/1980 | Goffredo ................ | 156/345.15 |
| 4,559,098 A | * | 12/1985 | Dunn ..................... | 156/345.15 |
| 4,998,022 A | * | 3/1991 | Tregay ........................ | 250/577 |
| 5,845,660 A | * | 12/1998 | Shindo et al. ............ | 134/56 R |
| 6,109,278 A | * | 8/2000 | Shindo et al. ............ | 134/56 R |
| 6,192,751 B1 | * | 2/2001 | Stein et al. ............... | 73/290 V |
| 6,228,211 B1 | * | 5/2001 | Jeong ..................... | 156/345.11 |
| 6,551,443 B1 | * | 4/2003 | Doh ....................... | 156/345.11 |

FOREIGN PATENT DOCUMENTS

| | | | |
|---|---|---|---|
| JP | 61247034 A | * | 11/1986 |
| JP | 2138459 | | 5/1990 |
| JP | 3022390 | | 1/1991 |
| JP | 4116619 | | 4/1992 |
| JP | 5249422 | | 9/1993 |
| JP | 5249423 | | 9/1993 |
| JP | 7168172 | | 7/1995 |

OTHER PUBLICATIONS

English Translation of JP 61-247034 to Karita, translated by the McElroy Translation Company; Jul., 2005.*

* cited by examiner

*Primary Examiner*—Parviz Hassanzadeh
*Assistant Examiner*—Maureen G. Arancibia
(74) *Attorney, Agent, or Firm*—McKenna Long & Aldridge LLP

(57) ABSTRACT

Disclosed is an etching apparatus enabling to increase productivity of etching glass substrates. The present invention includes an etching bath having an etchant, a plurality of sensors inside the etching bath detecting a level of the etchant, and a deionized water tube spraying a deionized water to the sensors.

10 Claims, 3 Drawing Sheets

ETCHING APPARATUS

This application claims the benefit of the Korean Application No. P2001-88521 filed on Dec. 29, 2001, which is hereby incorporated by reference.

BACKGROUND OF THE INVENTION

1. Field of the Invention

The present invention relates to an etching apparatus for a liquid crystal display device, and more particularly, to an etching apparatus enabling to increase productivity by sensing a level of an etchant using a contact sensor and preventing the sensor from being degraded by particles.

2. Discussion of the Related Art

Recently, many efforts have been made to research and develop various flat display panels such as LCD (liquid crystal display), PDP (plasma display panel), ELD (electroluminescent display), VFD (vacuum fluorescent display), and the like. LCD is practically used because of the characteristics or advantages of high quality image and low power consumption.

The liquid crystal display device includes lower and upper substrates confronting each other to leave a predetermined interval from each other and a liquid crystal layer formed between the substrates. A black matrix and a color filter layer are formed on the upper substrate. And, on the lower substrate formed are a plurality of gate and data lines arranged horizontally and vertically with a predetermined interval from each other to define pixel areas and thin film transistors and pixel electrodes formed in the pixel areas, respectively.

Lightweight and compact size are demanded for the liquid crystal display device to be applied to portable TV set, notebook computer, and the like. Yet, the structure or technology of the liquid crystal display device has limitation for the lightweight and compact size. However, the glass substrate as a basic element of the liquid crystal display device is the heaviest in the components of the liquid crystal display device. Hence, many efforts are made to reduce the weight of the glass substrate.

In order to reduce the weight of the glass substrate, a thickness of the glass substrate should be decreased. Yet, a physical force is occasionally applied to the glass substrate in the process of fabricating the liquid crystal display device. And, the glass substrate undergoes a number of heating and cooling processes. Hence, the thin glass becomes easy to be broken. Recently, used is a new method including the steps of using a thick glass substrate in the early stage of process and thinning the glass substrate in the later process. Namely, devices and color filters are formed on thick glass substrates to prepare upper and lower glass substrates, the upper and lower glass substrates are bonded to each other, and then outer surfaces of the glass substrates are etched to reduce an overall thickness of the liquid crystal display device.

Generally, the glass substrate is etched by wet etching carried out in a manner that the glass substrate is dipped in a bath filled with an etchant of strong acid etching a surface of the glass substrate.

However, such a method of wet etching makes the uneven surface of the substrate since particles generated from the etching process sticks to the substrate. Moreover, if the supply of the etchant fails to be controlled, the glass substrate is etched in part to generate the failure caused by the difference between the etched and non-etched portions.

In order to overcome such problems, a supply flow of an etchant is controlled using an etching apparatus equipped with a sensor enabling to sense the supply flow of the etchant.

An etching apparatus according to a related art is explained by referring to the attached drawings as follows.

FIG. 1 illustrates a schematic cross-sectional view of an etching apparatus according to a related art.

Referring to FIG. 1, an etching apparatus according to a related art includes an etching bath 1 having an etchant, a bubble plate 3 installed at a lower side inside the etching bath 1 to generate bubbles by a gas or an air supplied from outside to remove particles on a surface of a substrate which is being etched, a porous plate 5 installed on the bubble plate 3 to support a glass substrate (not shown in the drawing) to be etched, a supply pipe 15 supplying the bubble plate 3 with the air or the gas ($N_2$), a buffer tank 13 discharging and filtering the etchant used for etching from the etching bath 1 through an etchant discharging pipe 11 for temporary storage, a deionized water supply unit 17 supplying deionized water, an undiluted etchant supply unit 19 supplying an undiluted etchant, an etchant supply tank 9 supplied with the deionized water and the undiluted etchant by the deionized water and the undiluted etchant supply units 17 and 19 and mixing the supplied deionized water and crude etchant with each other to supply the etching bath 1 with the etchant having a predetermined concentration through an etchant supply pipe 7, and an etchant detecting sensor 21 installed at an upper side of an inner wall of the etching bath 1 to detect a level of the etchant supplied to the etching bath 1.

In this case, the etchant supply tank 9 mixes the etchant using the deionized water supplied by the deionized water supply unit 17 and the undiluted etchant(ex. HF) supplied by the undiluted etchant supply unit 19, or is supplied with the etchant, which is recycled after completion of etching, from the buffer tank 13, to make the etchant having the predetermined concentration to be sent to the etching bath 1.

A plurality of glass substrate(not shown in the drawing) that will be etched are stood straight on the porous plate 5 with a predetermined interval from each other, and are dipped in the etchant filling the etching bath 1 for etching. Bubbles are generated through the bubble plate 3 and the etchant circulates uniformly by the bubbles. Thus, the glass substrates can be etched evenly. And, the bubbles detach the particles caused by the etching process from surfaces of the substrates.

Moreover, a guard 2 is formed on the inner wall of the etching bath 1 to protect the etchant detect sensor 21, and has a structure that front and rear sides in the drawing are open. If the etchant is supplied over a predetermined level, the etchant is put inside the guard 2.

In this case, when the etchant supplied from the etchant supply tank 9 to the etching bath 1 is supplied to the amount that the glass substrates are dipped in the etchant in part, the glass substrates fail to be etched uniformly but the portions of the glass substrates dipped in the etchant are etched only, whereby etch failure occurs. Hence, the etchant should be supplied to the level enabling to have the glass substrates dipped in the etchant entirely.

Therefore, it is able to control the supply of the etchant to the etching bath 1 stably using the etchant detect sensor 21 installed at the upper inner wall of the etching bath 1 before the etch is carried out. Moreover, it is also able to check the discharged state when the etchant is drained from the etching bath 1 after the completion of the etch.

Namely, the etchant detect sensor 21 according to the related art is a level sensor using an air pressure difference according to height of the etchant and the nitrogen gas ($N_2$) supplied regularly, and includes, as shown in FIG. 2, a magnetic valve 22 controlling a supply of a nitrogen gas for constant pressures of three tubes by receiving a nitrogen gas ($N_2$) of low pressure from a portion of the air supply pipe ('15' in FIG. 1), a plurality of nitrogen pressure difference sensors 23a, 23b, and 23c detecting a pressure difference of the nitrogen gas cut off by an etchant 25 supplied inside an etching bath by having the nitrogen gas flow, and "L(low)", "H(high)", and "HH(high high)" nitrogen tubes 24a, 24b, and 24c receiving the nitrogen gas at low pressure to discharge the nitrogen gas in accordance with height.

Operation of the above-constituted nitrogen pressure difference sensor is explained in detail as follows.

First of all, when the etchant 25 is supplied inside the etching bath 1 for etching the glass substrate, the etching apparatus according to the related art detects that the nitrogen gas fails to be discharged since the "L" nitrogen tube 24a of the etchant detect sensor is blocked by the etchant having been supplied over a predetermined level, thereby recognizing that the etchant is being supplied inside the etching bath 1. The etching apparatus keeps supplying the etchant even if the nitrogen gas is unable to be discharged due to the blocked "L" nitrogen tube 24a, and detects that the etching bath 1 is full of the etchant since the nitrogen gas is discharged no more due to the blocked "HH" nitrogen tube 24c, thereby stopping the supply of the etchant.

Subsequently, the nitrogen gas is put in the bubble plate 3 from the air supply pipe 15 to generate bubbles, whereby an etching process of the glass substrates is carried out normally.

In this case, the guard 2 protects the etchant detect sensor 21 from the bubbles generated from the etchant, whereby the etchant maintains a horizontal level. The etching process is performed normally when the nitrogen gas is discharged through the "HH" or "H" nitrogen tubes 24c or 24b. Yet, etching failure may occur when the nitrogen gas is discharged through the "L" nitrogen tube 24a.

Finally, when the etchant 25 is drained from the etching bath 1 after the completion of etching the glass substrate, the level of the etchant is lowered. Hence, the etching apparatus according to the related art recognizes that the etchant is normally drained since the nitrogen gas is discharged through the "L(low)", "H(high)", and "HH(high high)" nitrogen tubes 24a, 24b, and 24c, in order.

Unfortunately, the etching apparatus according to the related art has the following problems or disadvantages.

First of all, as the etching process is repeated, sludge as precipitates of the glass etched by the etchant blocks at least one of the "L", "H", and "HH" nitrogen tubes of the etchant detect sensor to perform the supply and discharge of the etchant abnormally. Hence, the etching apparatus according to the related art can cause failure of the etching process.

Secondly, when the "L" nitrogen tube is blocked, as shown at 26 in FIG. 2, a cleaning process for cleaning the glass substrate with deionized water is carried out under the circumstance that the drain of the etchant is not completed. Hence, the etching apparatus according to the related art causes degradation of the cleaning work since the deionized water as the cleaning material is mingled with the etchant.

Finally, the etching apparatus according to the related art consumes cost and time for replacement of the components or periodical cleaning works to prevent outlets of the "L", "H", and "HH" nitrogen tubes from being blocked by the sludge, thereby reducing productivity.

SUMMARY OF THE INVENTION

Accordingly, the present invention is directed to an etching apparatus that substantially obviates one or more problems due to limitations and disadvantages of the related art.

An object of the present invention is to provide an etching apparatus enabling to increase productivity by detecting a level of an etchant supplied inside an etching bath using a contact type optical sensor on an etching process of a glass substrate and having a deionized water tube for cleaning the contact type optical sensor after completion of the etching process of the glass substrate.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an etching apparatus according to the present invention includes an etching bath having an etchant, a plurality of sensors inside the etching bath detecting a level of the etchant, and a deionized water tube spraying a deionized water to the sensors.

Preferably, each of the sensors is a contact type optical sensor detecting whether to be contacted with an air or the etchant.

More preferably, the contact type optical sensor includes a light-emitting unit irradiating a light, a light-receiving unit detecting the irradiated light from the light-emitting unit, and an optical fiber having a conical or triangular end wherein the light emitted from the light-emitting unit is reflected or refracted on the end to be transferred to the light-receiving unit or not.

More preferably, the optical fiber is formed of a TEFLON (polytetrafluoroethylene) based material.

More preferably, the optical fiber has an index of refraction similar to that of the etchant.

Preferably, the sensor includes a first sensor detecting a level of the etchant and a second sensor detecting a maximum level of the etchant.

Preferably, the deionized water tube is installed horizontally over an upper side of the sensors.

Preferably, the etching apparatus further includes a guide fixed to a bottom of the etching apparatus and porous and bubble plates supported by the guide.

Preferably, the etchant is HF.

Preferably, the etching apparatus further includes an etchant supply tank supplying the etching bath with the etchant and a buffer tank draining the etchant from the etching bath.

Accordingly, the etching apparatus according to the present invention includes the contact type optical sensors enabling to check the level of the etchant on the etching process of the substrates and the deionized water tube supplying the deionized water to clean the contact type optical sensors after completion of the etching process of the glass substrate, thereby enabling to wash out the sludge generated from the optical sensor. Therefore, the present invention reduces periodical check and cleaning, thereby enabling to increase productivity.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
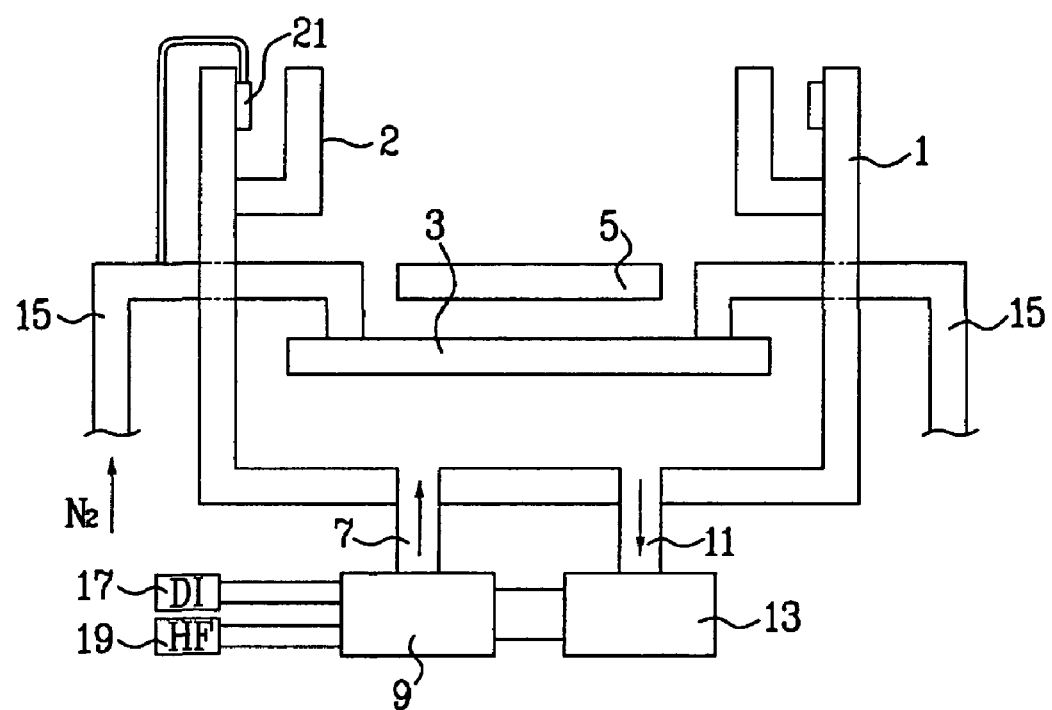
FIG. 1 illustrates a schematic cross-sectional view of an etching apparatus according to a related art.
Figure 2:
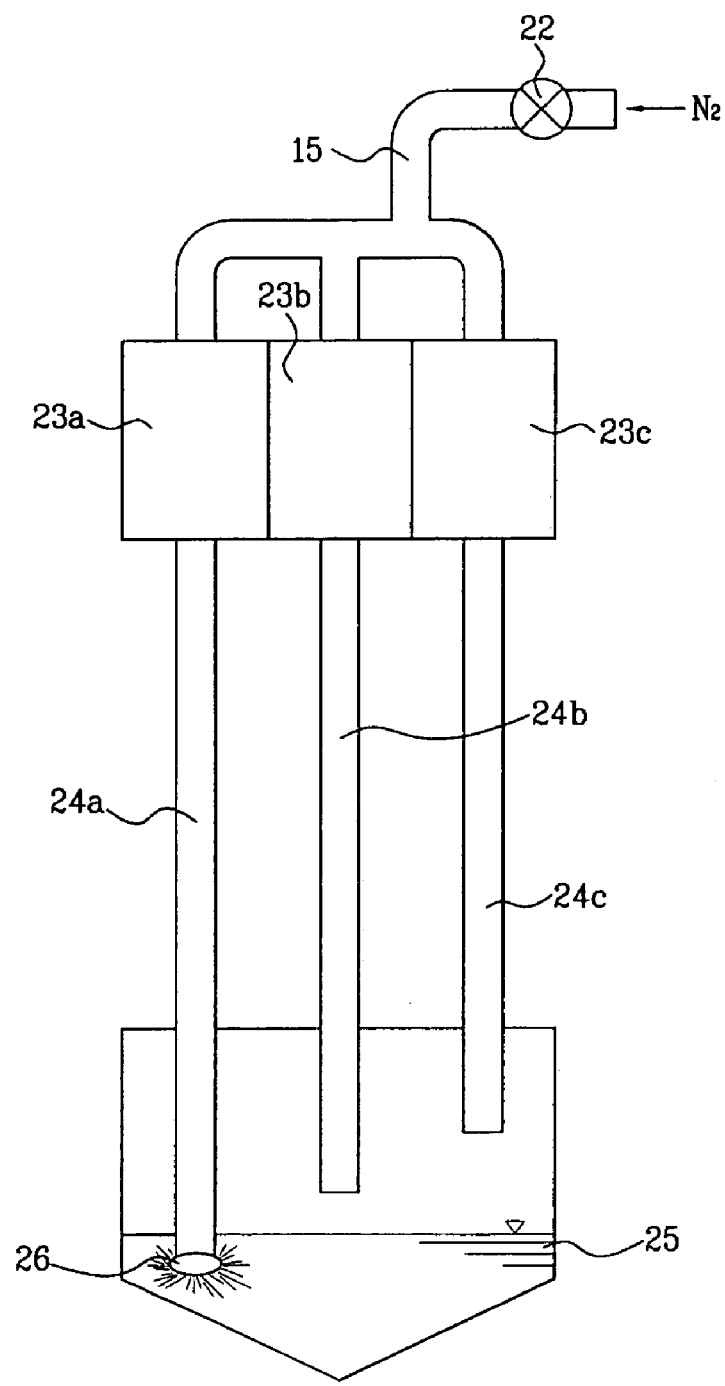
FIG. 2 illustrates a cross-sectional view of a nitrogen pressure difference sensor according to a related art.
Figure 3:
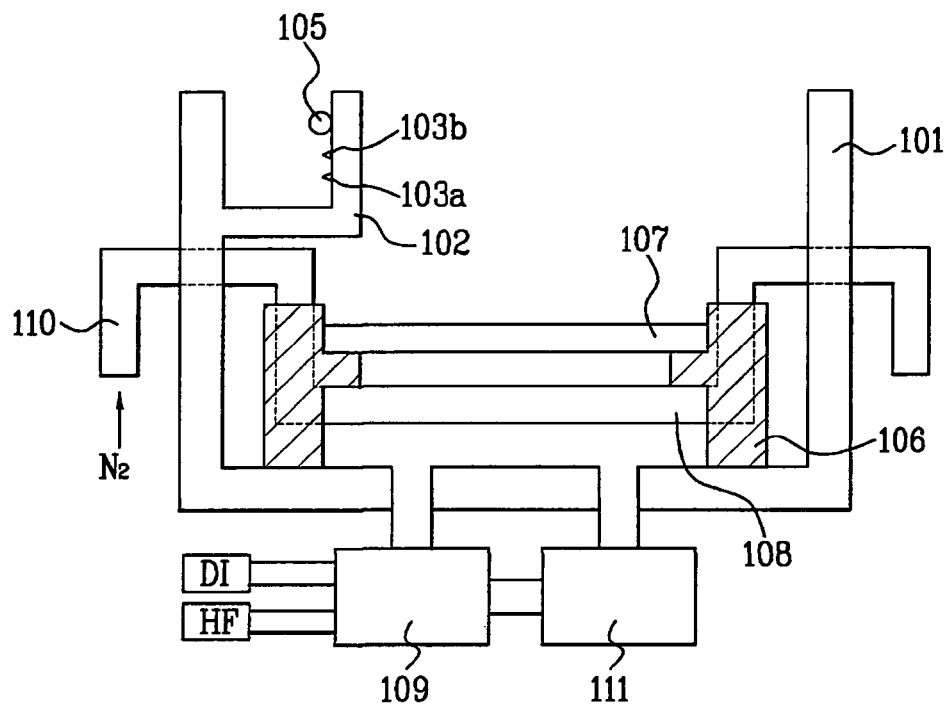
FIG. 3 illustrates a schematic cross-sectional view of an etching apparatus according to the present invention.

FIG. 3 illustrates a schematic cross-sectional view of an etching apparatus according to the present invention.

Referring to FIG. 3, an etching apparatus according to the present invention includes an etching bath 101 holding an etchant therein, an etchant supply tank 109 supplying the etching bath 101 with the etchant, a buffer tank 111 filtering to store temporarily the etchant completing an etching process in the etching bath 101, a plurality of contact type optical sensors 103a and 103b installed inside the etching bath 101 to detect levels of the etchant supplied and discharged from the etchant supply tank 109 and the buffer tank 111, respectively, and a deionized water tube 105 having at least one deionized water hole(not shown in the drawing) spraying a deionized water to clean the contact type optical sensors 103a and 103b.

And, the etching apparatus further includes a supporter 106 installed to be fixed to a bottom surface of the etching bath 101, a porous plate supported by the supporter 106 to support a glass substrate, a bubble plate 108 supported by the supporter 106 to be in parallel with the porous plate 107, and a gas supply pipe 110 supplying the bubble plate 108 with a nitrogen (N$_2$) gas.

A plurality of glass substrate(not shown in the drawing) that will be etched are stood straight on the porous plate 107 with a predetermined interval from each other, and are dipped in the etchant filling up the etching bath 101 for etching. Bubbles are generated from the bubble plate 103 by the nitrogen gas supplied from the gas(air) supply pipe 110 and the etchant circulates uniformly by the bubbles ascending between the glass substrates. Thus, the glass substrates can be etched evenly.

Moreover, a guard 102, to which a plurality of the contact type optical sensors 103a and 103b and the deionized water tube 105 are fixed, has a structure that front and rear sides in the drawing are open. If the etchant is supplied over a predetermined level, the etchant is put inside the guard 102. And, a plurality of the contact type optical sensors 103a and 103b detecting the level of the etchant supplied inside the etching bath 101 are detecting sensors using a difference of refractive index. Each of the contact type optical sensors 103a and 103b includes a light-emitting unit for irradiating a light, a light-receiving unit detecting the irradiated light from the light-emitting unit, and an optical fiber made of a TEFLON (polytetrafluoroethylene) material having excellent oil and chemical withstanding properties to have a conical or triangular end wherein the light emitted from the light-emitting unit is reflected or refracted on the end to be transferred to the light-receiving unit or not in accordance with an external state.

Each of the contact type optical sensors 103a and 103b makes use of the principle that: a light goes straight in a medium having a constant index of refraction; and a portion of the light transmits but the other portion is reflected on a boundary between two adjacent mediums having different refraction indexes, respectively. Hence, the optical fiber is made of a material having a refraction index similar to that of the etchant so that the light is reflected on the end contacted with an air or is irradiated from the end contacted with the etchant.

Namely, each of the contact type optical sensors 103a and 103b has the optical fiber made of the TEFLON (polytetrafluoroethylene) material having a refraction index similar to that of a liquid and makes its end conical or triangular shape. Hence, the light emitted from the light-emitting unit becomes incident along the optical fiber in the air, and is refracted on two sides of the cone or triangle as the refraction boundary area of the end contacted with the air to be detected by the light-receiving unit. In the liquid, the light incident on the optical fiber is refracted(irradiated) on the end of the optical fiber since the refraction indexes of the optical fiber and etchant are similar to each other. Hence, the light fails to be reflected on the light-receiving unit.

In this case, a detecting signal is controlled to output 'no' if the contact type optical sensors 103a and 103b are contacted with the air outputs, but 'yes' if the contact type optical sensors 103a and 103b are contacted with the liquid.

Therefore, the etching apparatus according to the present invention enables to control the level of the etchant which is being supplied into the etching bath using the contact type optical sensors 103a and 103b making use of the difference of refraction indexes between the air and liquid.

Figure 4:
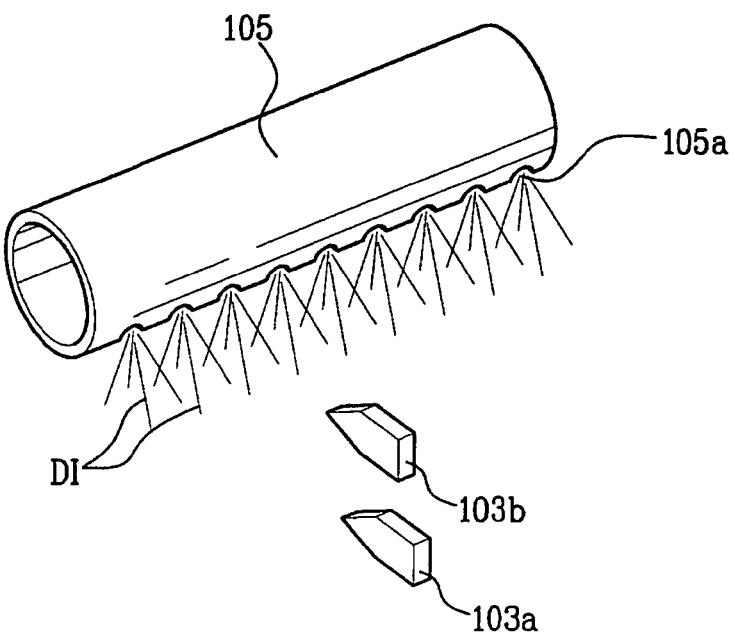
FIG. 4 illustrates a bird's-eye view of a deionized water tube and optical sensors according to the present invention.

FIG. 4 illustrates a bird's-eye view of a deionized water tube and optical sensors according to the present invention.

Referring to FIG. 4, each of "H" and "HH" optical sensors 103a and 103b is stood straight to detect a level of an etchant supplied into the etching bath ('101' in FIG. 3). And, a deionized water tube 105 having a plurality of deionized water holes 105a spraying deionized water to clean the contact type optical sensors 103a and 103b is disposed over the "H" and "HH" optical sensors 103a and 103b horizontally.

In this case, a diameter of the deionized water tube 105 is about 4 mm, and cleans a plurality of the contact type optical sensors 103a and 103b not by being supplied with the deionized water if the etchant exists in the etching bath 101 but by being supplied with the deionized water if there is no etchant in the etching bath 101.

It may happen that sludge generated from the etchant on the etching process sticks to the contact type optical sensors. Yet, the present invention enables to remove cleanly the sludge by the deionized water supplied from the deionized water tube as soon as the etching process is completed.

An etching process using the above-constituted etching apparatus of the present invention is explained as follows.

First of all, a plurality of glass substrates are stood straight on the porous plate 107, and the etchant stored with a predetermined concentration in an etchant mixing tank(not shown in the drawing) is supplied into the etching bath 101. Once a predetermined quantity of the etchant is supplied to the etching bath 101 to have the "H" contact type optical sensor 103*a* dipped in the etchant, the "H" contact type optical sensor 103*a* recognizes that a proper quantity of the etchant has been supplied thereto.

In this case, the etchant is preferably HF.

Subsequently, when the etchant is kept being supplied to the etching bath 101 to have the "HH" contact type optical sensor 103*b* dipped in the etchant, the "HH" contact type optical sensor 103*b* detects that the etchant is supplied excessively to stop supplying the etchant.

Simultaneously, the nitrogen gas is injected into the bubble plate 108 to produce bubbles. The bubbles then penetrates the holes of the porous plates 107 to make the etchant circulate in the etching bath 101, whereby the glass substrates are etched.

In this case, a temperature measuring device is further installed inside the etching apparatus to measure the temperature caused by exothermic reaction between the substrates and etchant. Hence, the glass substrates can be etched evenly.

The etching process is then carried out on the glass substrates for a predetermined time. After the etching of the glass substrates has been finished, the etchant used for the etch of the glass substrates starts to be drained. Once the "H" contact type optical sensor 103*a* is exposed to the air, it is detected by the "H" contact type optical sensor 103*a* that the etchant is being drained.

In this case, vaporization of the etchant during the etching process of the glass substrates can decrease the etchant to expose the "HH" contact type optical sensor 103*b* to the air. Hence, it is possible to ignore the detection of the "HH" contact type optical sensor 103*b*.

Thereafter, the etchant is completely removed from the etching bath 101 to finish the etching process of the glass substrates. The glass substrates and etching bath 101 are then cleaned to remove the etchant using the deionized water.

In this case, if the etching process of the glass substrates is completed, the deionized water tube 105 is supplied with the deionized water to clean the "H" and "HH" contact type optical sensors 103*a* and 103*b*. Moreover, the "H" and "HH" contact type optical sensors 103*a* and 103*b* are kept being cleaned until a next etching process of another glass substrates is initiated.

Thus, the etching apparatus according to the present invention enables to detect the level of the etchant in the etching bath 101 using the contact type optical sensors 103*a* and 103*b* as well as clean the contact type optical sensors using the deionized water tube 105 to which the deionized water is supplied all the time after the completion of the etching process of the glass substrates. Therefore, the present invention enables to increase productivity in accordance with maintenance of the etching apparatus.

Accordingly, the etching apparatus according to the present invention includes the contact type optical sensors enabling to check the level of the etchant on the etching process of the glass substrates and the deionized water tube supplying the deionized water to clean the contact type optical sensors after completion of the etching process of the glass substrates, thereby enabling to increase productivity in accordance with maintenance of the etching apparatus.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An etching apparatus comprising:
   an etching bath having an etchant;
   a plurality of sensors inside the etching bath for detecting a level of the etchant;
   a deionized water tube for spraying a deionized water to the sensors;
   a guard having an opening and formed on an inner wall of the etching bath, wherein the sensors and the deionized water tube are fixed to the guard;
   a guide fixed to a bottom of the etching apparatus; and
   a porous plate and a bubble plate supported by the guide.

2. The apparatus of claim 1, wherein each of the sensors is a contact type optical sensor detecting contact with air or the etchant.

3. The apparatus of claim 2, wherein the contact type optical sensor comprises;
   a light-emitting unit irradiating a light;
   a light-receiving unit detecting the irradiated light from the light-emitting unit; and
   an optical fiber having a conical or triangular end wherein the light emitted from the light-emitting unit is reflected or refracted on the end to be transferred to the light-receiving unit or not.

4. The apparatus of claim 3, wherein the optical fiber includes polytetrafluoroethylene.

5. The apparatus of claim 3, wherein the optical fiber has an index of refraction similar to that of the etchant.

6. The apparatus of claim 1, wherein the sensors comprise a first sensor detecting a level of the etchant and a second sensor detecting a maximum level of the etchant.

7. The apparatus of claim 1, wherein the etchant is HF.

8. The apparatus of claim 1, further comprising:
   an etchant supply tank supplying the etching bath with the etchant; and
   a buffer tank draining the etchant from the etching bath.

9. An etching apparatus comprising:
   an etching bath having an etchant;
   a plurality of sensors inside the etching bath detecting a level of the etchant;
   a deionized water tube spraying a deionized water to the sensors, wherein the deionized water tube is installed horizontally over an upper side of the sensors; and
   a guard having an opening and formed on an inner wall of the etching bath, wherein the sensors and the deionized water tube are fixed to the guard.

10. An etching apparatus for etching glass substrates for a liquid crystal display comprising:
    an etching bath having an etchant, the etchant having a sludge generated during the etching of the glass substrates;
    a porous plate and a bubble plate in the etching bath for detaching the sludge from the glass substrates during the etching;
    a plurality of sensors inside the etching bath for detecting a level of the etchant;
    a deionized water tube for spraying a deionized water to the sensors so as to remove the sludge stuck to the sensors; and
    a guard having an opening and formed on an inner wall of the etching bath, wherein the sensors and the deionized water tube are fixed to the guard.

* * * * *